3,058,971
METHOD OF ISOLATING OLEFIN POLYMER FROM POLYMERIZATION REACTION MIXTURE
Floyd F. Miller, Wadsworth, and Albert F. Ekar, Cleveland, Ohio, assignors to Goodrich-Gulf Chemicals, Inc., Pittsburgh, Pa., a corporation of Delaware
No Drawing. Filed Dec. 27, 1955, Ser. No. 555,299
11 Claims. (Cl. 260—94.3)

The present invention relates generally to the treatment of solvent- and catalyst-containing reaction mixtures to recover a stable polymer in a usable form. More specifically, the invention relates to the recovery, without appreciable catalyst-induced polymer degradation, of a hydrocarbon polymer from a polymerization mixture prepared by solution polymerization of hydrocarbon monomers in the presence of heavy metal organometallic catalysts.

In copending U.S. applications, Serial No. 472,786, filed December 2, 1954, and Serial Nos. 503,027 and 503,028, filed April 21, 1955, there is disclosed, the preparation of, respectively, an essentially all cis-1,4 form of polyisoprene greatly resembling natural rubber in structure and properties; an essentially all trans-1,4 polyisoprene; and an all trans-1,4 polybutadiene and other polyolefin hydrocarbon polymers and interpolymers of novel properties. These new type polymers are prepared by polymerization in an inert solvent or diluent containing certain heavy metal organometallic catalysts of pronounced directive activity. Such catalysts, for example a catalyst prepared by reacting an alkyl aluminum compound such as triisobutyl aluminum or trioctyl aluminum with a heavy metal compound such as titanium tetrachloride, are extremely dark in color and usually contain a difficultly-soluble precipitate which may contaminate the polymer isolated from the mixture. In the copending application of Samuel E. Horne, Jr., Serial No. 555,256, filed herewith, now Patent No. 2,962,488, it is disclosed that treatment of such reaction mixture with an alcohol, in an inert atmosphere and before the polymer and catalyst have been contacted with oxygen, water and other substances capable of reacting with and insolubilizing the residual catalyst, inactivates the catalyst, discharges most of the color, shortstops the polymerization reaction and converts the catalyst and its residues (including the precipitate) to a more soluble, less easily oxidized form in which it is more readily removed from the solution and polymer. It was noted, however, that whenever a solution of unsaturated polymer in an alcohol-miscible solvent such as hexane, heptane or benzene was treated with a miscible alcohol and allowed to stand, the alcohol-catalyst reaction products had a pronounced tendency to degrade the dissolved high molecular weight polymers (as shown by intrinsic viscosities which sharply decreased with time) and to increase the proportion of tight, highly cross-linked gel in the polymer. It was believed that the only way in which this degradation could be reduced was by rapidly precipitating the polymer out of solution as soon as possible after alcohol addition by the use of a substantial quantity of a polymer non-solvent such as an alcohol, acetone and the like. Even so, with known procedures considerable degradation still was obtained. Moreover, such a procedure, because it uses such large volumes of precipitant is expensive and increases solvent recovery problems. More importantly however, the addition of the polymer solution to alcohol or acetone, or vice versa, usually leads to the formation of an agglomerated mass of polymer which is difficult to extract and handle in subsequent work-up operations.

When the unsaturated diene-derived polymers are prepared in a solvent or diluent in which the high molecular weight polymers are not completely soluble, for example butane, the polymer is obtained as a slurry of a sticky, partially swollen polymer particles dispersed in the solvent. Slurries of this type are difficult to handle, especially in the alcohol shortstop step since the alcohol tends to be occluded or trapped in the polymer and the alcohol tends to harden the sticky polymer into the large agglomerates or masses from which the catalyst-alcohol reaction products are not easily extracted or separated.

It is among the objects of this invention, therefore, to provide a method of removing catalyst residues from polymer made with the above-described heavy metal organometallic catalysts; to provide such a method wherein the polymeric content of a solution or slurry-like reaction mixture is converted to a crumb-like product of controlled particle size and physical condition whereby it is easily handled with conventional equipment; to provide a method wherein the active catalyst content of a polymerization reaction mixture is efficiently inactivated; to provide such a method wherein the polymer is not degraded and is isolated in a stable, non-degraded and non-corrosive form; and to provide such a method which does not complicate recovery of the polymerization solvent. Other objects and advantages will be apparent, or will become apparent, in the following more detailed description of the invention.

In accordance with the present invention it has been discovered that polymerization reaction mixtures prepared with the above-described heavy metal organometallic catalysts are precipitated and hardened by treatment with a solvent:alcohol or diluent:alcohol mixture so as to be converted to a slurry of crumb-like particles which are not sticky and which can be handled more easily by conventional equipment in subsequent operations. It has also been found that such a treatment efficiently extracts a substantial proportion of the catalyst residues which are easily removed from the crumb slurry in the filtrate. Such treatment can also be utilized to inactivate active catalyst residues in the polymerization reaction mixtures, especially those which are solutions of dissolved unsaturated polymer, the method involving substantially simultaneous catalyst inactivation (shortstopping action) and polymer precipitation so as to greatly reduce polymer degradation by the active catalyst residues and active alcohol-catalyst reaction products. Such a method produces an easily handled product which is free of deleterious catalyst products, which is higher in molecular weight, and which is more stable, less corrosive and more satisfactory in subsequent molding and curing operations.

The method of this invention involves the addition of the polymerization reaction mixture to the mixed solvent:alcohol or diluent:alcohol precipitating-hardening-extracting medium with more or less vigorous agitation to disperse the former in the latter in a suitably fine state of subdivision. It is believed that the mixed solvent:alcohol medium absorbs solvent or diluent from the droplets of dispersed reaction mixture thereby insolubilizing the polymer therein and (if polymer is in solution) throwing the polymer out of solution. After solid particles of polymer are obtained (or if the reaction mixture is a slurry) the mixed solution continues to slowly remove solvent from the polymer particles, thereby hardening and reducing the stickiness of the individual polymer particles and producing a crumb-like product which is easily handled and which facilitates further washing and extraction operations and also the final drying operation. The slow removal of solvent from the polymer particles permits the precipitate to aggregate slightly to produce a crum large enough to be retained by filter screens.

The reverse procedure, that is, the addition of the mixed solvent:alcohol solution to the reaction mixture, is not operative. In many cases, precipitation will not occur unless a quite large volume of solvent:alcohol is employed. If sufficient alcohol is added in this manner, the solution will slowly change in composition until precipitation occurs in mass with the formation of unextractable masses or clumps of polymer. Likewise, the addition of a polymer solution to undiluted alcohol, or vice versa, seems to form a tough skin on the surface of the solvated polymer and the skin may trap a substantial amount of catalyst residue in the polymer. Also, addition of a polymer solution or slurry to undiluted alcohol, or vice versa, results in the formation of large masses or globs of polymer which are difficult to handle and which cannot be efficiently extracted.

The polymer solution or slurry is preferably conducted into the mixed solvent-alcohol solution before the reaction mixture has been exposed to sulfur and sulfur-containing compounds; oxygen, water and other substances containing active oxygen such as peroxides, ketones, esters, etc.; or other compounds which might react with the catalyst residues converting them to less soluble forms and/or liberating acidic corrosive substances. If this is done, the mixed solvent:alcohol precipitating-hardening filtrate will be found to contain up to 95 percent of the catalyst residue. If desired, the catalyst and its residues in a polymer solution can be inactivated or shortstopped, prior to the addition of the reaction mixture to the mixed solvent:alcohol medium, providing the inactivated catalyst residues are thereby converted to a form which does not degrade dissolved polymer. If the catalyst shortstop converts the catalyst to a form soluble in the solvent:alcohol medium, treatment with the latter will precipitate the polymer, harden and agglomerate it to a crumb of controlled size, and extract a substantial proportion of the shortstopped catalyst. If, however, the polymerization mixture is exposed to moisture and/or air, prior to catalyst inactivation, unsaturated polymer will be degraded and contain a high proportion of ash. Likewise, reaction mixtures containing saturated polymers such as polyethylene, exposed to moisture and air before work-up with the solvent:alcohol may discolor on molding, may be corrosive to handling equipment and may have poor electrical properties. Contact between a reaction mixture containing active catalyst and the solvent:alcohol medium is preferably effected in an inert atmosphere such as nitrogen, argon, helium or hydrocarbon vapors.

Following the contact with the solvent:alcohol solution, the polymer crumb is agitated to allow slight aggregation and hardening to occur. It can then be filtered or decanted off and the filter cake can be washed on the filter with fresh solvent:alcohol mixture, with undiluted alcohol or with water, alcohol-water, acetone, acetone-water, etc., or the filter cake can be reslurried in any of these liquid extractants, or the filter cake can be steam-, alcohol-vapor or solvent-vapor distilled to extract the catalyst and strip off residual solvent and alcohol, or it can be wash milled with warm water, etc. to drive off solvent and alcohol.

In the above-described solvent-alcohol shortstop-precipitation step, the mixed solvent:alcohol solution which is separated from the freshly precipitated polymer crumb will be found to contain up to 90 to 95 percent or more of the catalyst residues. A first wash in undiluted methanol or mixed solvent-alcohol will remove an additional 3 to 4 percent of the catalyst residue in the polymer to produce a polymer containing less than about 0.2 percent ash (as contrasted with 1.0 to 1.5 percent for an unextracted polymer). With two such washes the ash content is usually below 0.1 percent and with three below about 0.05 percent. Polymer washed two or three times by the reslurrying technique in most cases is suitable for electrical uses. Similarly washing with warm water in a wash mill (5 to 20 passes) reduces the ash content and steam-, acetone- or alcohol-vapor distillation to remove solvent from the polymer crumb will likewise extract the catalyst (inorganic residue) to a low figure. Water may be employed in any of these washing operations as well as acetone; methyl ethyl ketone, water-alcohol solutions, water-acetone solutions, carbon tetrachloride and the like.

As employed herein, with respect to the polymerization mixture, the terms "solvent" or "diluent" mean any inert solvent having solvency for at least the monomer polymerized, and preferably also for the polymer. For example, hexane, heptane, benzene, toluene and the like are excellent solvents for both the monomeric dienes and their polymers with the result that polymer solutions are usually results in a slurry of partially swollen insoluble polymer in a dilute solution of low molecular weight polymer thereof but not for high molecular weight diene polymers. As a result, polymerization of dienes in butane usually results in a slurry of partially swollen insoluble polymer in a dilute solution of low molecular weight polymer. While monomeric ethylene is soluble in most hydrocarbons, high molecular weight polyethylene is quite insoluble in most of these materials. The mixed solvent:alcohol medium, on the other hand, may contain any inert solvent or diluent and the latter can be the same or different than the solvent or diluent in the polymerization medium. In order to simplify solvent recovery problems, however, the solvent or diluent in the mixed precipitating-hardening medium should be the same as was employed as a solvent or diluent in the polymerization medium.

The term "alcohol" includes any aliphatic, aromatic or cycloaliphatic monohydric or polyhydric alcohol which is miscible in suitable proportion with the diluent to be employed in the mixed solution, and preferably also, miscible in proper proportion with the polymerization solvent or diluent. Illustrative alcohols of this class include methanol (preferred), ethanol, isopropanol, butanol, the pentanols, the hexanols, octanols, benzyl alcohol, cyclohexanol, and other monohydric alcohols as well as ethylene glycol, the polyethylene glycols, the polymethylene glycols, glycerine and the like. Where the mixed solvent:alcohol medium is employed as the sole catalyst shortstop, it is preferred that the alcohol employed have the ability to react readily with the catalyst to form soluble by-products. For most purposes the lower aliphatic alcohols (not more than about four carbon atoms) are miscible over a wide range of proportions with most solvents, and preferably with the preferred butane, hexane, heptane and benzene polymerization solvents. Methanol is of somewhat restricted miscibility with heptane but ethanol and isopropanol are miscible over a wide range with this solvent.

In the mixed solvent:alcohol precipitating medium it appears that the alcohol should be diluted with sufficient solvent or diluent to reduce the rate at which the former abstracts solvent from the polymer to the range where the polymer will precipitate at a controlled rate and in the form of fairly fine particles which then will aggregate to a certain extent before being fully hardened by the alcohol. The proportion or ratio (by volume) of solvent or diluent to alcohol for best operation will depend largely on (1) the particular solvent:alcohol or diluent:alcohol combination in the mixed solution and in the reaction mixture and the miscibility of these materials and (2) to a lesser extent on the temperature obtaining during mixing. For example, with benzene:methanol mixtures (at room temperatures) a volume ratio of about 1:1 will precipitate polyisoprene as one or more large masses of polymer which have a tendency to break up when subjected to shear under vigorous agitation. With increased proportions of methanol than this only one large mass of polymer is formed which is very difficult to break up. A mixture of benzene:methanol (4.17:1), upon addition of a benzene polyisoprene cement, forms a homogeneous solution with no visible precipitate. As the proportion of methanol is increased to a ratio of about 3:1, a very fine polymer precipitate is formed with a somewhat cloudy supernatant liquid. At 2.5:1 to 2:1 a very good, well-defined crumb and clear supernatant liquid is obtained. The crumb size continues to increase as the ratio approaches 1:1. In contrast, when the precipitating bath is cooled with ice water so as to be at about 0 to 5° C., the mixed solution seems to be a poorer solvent for the polymer so that a clear solution is not obtained until a ratio of about 6:1 is obtained. At 5:1 at ice water temperature a very fine dispersion of highly solvated solid polymer is obtained. At 4:1 a very fine crumb and cloudy supernatant liquid is obtained. At 3:1 a fine, well-defined crumb is obtained (best for handling purposes). At 2:1 a single clump is formed having a slight tendency to break up under vigorous agitation. Thus at room temperature ratios of about 1:1 to about 4:1 can be employed while at 0–5° C. ratios of about 2:1 to about 5:1 can be utilized.

Similarly, with toluene:methanol mixtures, ratios of 3:1 appear best at room temperature. With heptane:ethanol ratios from about 2:1 to about 2:3 are effective at room temperature with best results at about 3:2.

As noted above, lower temperatures appear to make the mixed solution a poorer solvent for the polymer and less alcohol is required for precipitation. With good solvents such as benzene, however, the lower temperatures (above freezing) reduce the stickiness of the polymer and reduce its tendency to agglomerate. This is believed to be the cause of the above-noted ratio effect with benzene:methanol. With the poorer solvents for the polymer, however, the solvent:alcohol volume ratio is less critical and may vary more widely. For example, butane is a fair solvent for most hydrocarbon monomers and a relatively poor solvent for the corresponding higher molecular weight polymers. As a result, the polymers are usually obtained as slurries of more or less swollen or solvated polymer. Since precipitation has already occurred, when these slurries are poured into mixed solvent:alcohol solutions, the composition of the latter should be such as to neither (1) swell the polymer nor (2) harden it too quickly before dispersion can take place. In butane:methanol mixtures at —2° C. (B.P. of butane) ratios of between about 3:1 and about 10:1 are operative, a coarse crumb being obtained at about 3:1 and a fine crumb at 8:1 to 10:1. Ratios of butane:methanol between about 5:1 and about 8:1 are best. While in general the lower temperatures decrease the stickiness of the crumb (in the presence of "good" solvents for the polymer), in some cases lowering the temperatures may freeze coagulate (or aggregate) certain reaction mixtures. For example, when a butane slurry of polyisoprene is poured into liquid butane or butane:methanol at —40° C. the slurry freezes into a mass which cannot be redispersed. At —2° C., however, the polyisoprene slurry can be dispersed in butane or butane:methanol, and as the temperature is reduced the particles of the slurry have a tendency to aggregate. Thus temperature can be employed to control the aggregation tendency of the crumb, heat being applied in some cases to increase aggregation (or cool to reduce aggregation) and in others cooling being employed to increase aggregation (or heat supplied to decrease it), as the case may be In any case it is a simple matter to select a suitable solvent: alcohol ratio to yield a crumb while controlling the temperature, if necessary, to control the aggregation tendencies of the fresh crumb.

The polymerization mixtures which are effectively treated by the method of this invention are those prepared by the polymerization in an inert hydrocarbon solvent and in the presence of the heavy metal organometallic catalysts described below of monomeric mixtures containing at least a significant proportion of an ethylenically-unsaturated hydrocarbon monomer including particularly the conjugated diolefins such as the conjugated dienes including butadiene-1,3, the methyl butadienes such as isoprene or piperylene, the conjugated polyolefins containing more than five carbon atoms such as 2,3-dimethyl-butadiene-1,3, 2-ethyl-butadiene-1,3, 4-methyl-pentadiene-1,3, 2-ethyl-pentadiene-1,3, hexadiene-2,4, hexatriene-1,3,5, 4-methyl-hexadiene-1,3, 2,4-dimethyl-pentadiene-1,3, 2-isopropyl-butadiene-1,3, 1,1,3-trimethyl-butadiene-1,3, octatriene - 2,4,6, octadiene - 2,4, 1,1-dimethyl-3-tertiary-butyl-butadiene-1,3, 2 - neopentyl-butadiene-1,3, myrcene, alloocimine or the like; the conjugated alicyclic polyolefinic hydrocarbons such as cyclopentadiene, cyclohexadiene-1,3, cycloheptadiene-1,3, dimethyl fulvene, and others; or an aryl-substituted diolefin hydrocarbon such as phenyl-butadiene-1,3, 2,3-diphenyl-butadiene-1,3, diphenyl fulvene and others; the monoolefinic hydrocarbons such as ethylene, propylene, butene-1, pentene-1, octene-1, styrene and others; mixtures of one or more of polyolefin hydrocarbons such as butadiene-1,3 or isoprene with one or more monoolefins such as ethylene, propylene, isobutylene, isobutylene, styrene and others; and mixtures of one or more of the polyolefin and/or monoolefin hydrocarbons with non-conjugated polyolefins such as allene, diallyl, dimethallyl, propyl allene, squalene, 1-vinyl-cyclohexene-3, divinyl benzene and others.

The polymerization mixtures which are particularly well adapted to be handled by the method of this invention are those made from monomeric materials containing a predominant proportion (i.e. above about 50 percent by weight) of a conjugated diene such as butadiene-1,3, isoprene, piperylene, and the like, with or without other monomers. These dienes usually polymerize to form high molecular weight, unsaturated polymers which are generally soluble in or are obtained as solvent swollen slurries in most inert hydrocarbon solvents and accordingly can be effectively shortstopped, precipitated and extracted by the controlled precipitation-hardening technique of this invention.

The heavy metal organometallic catalysts which may be employed to produce a polymerization reaction mixture susceptible to treatment by the method of this invention are made up of metal atoms connected to radicals capable of joining to metal atoms in organometallic compounds, at least one of such radicals being an organic radical connected to a metal atom through a carbon atom, and at least one of the metal atoms being a heavy metal occurring in the 4th to 10th positions of the long periods of the periodic table (as shown on page 342, Handbook of Chemistry and Physics, 33rd edition, published by Chemical Rubber Publishing Co., Cleveland, Ohio, 1952). In this definition of the catalyst the term "radicals capable of joining to metal atoms in organometallic compounds" includes (1) organic radicals capable of linking to metal through carbon such as alkyl radicals, aryl radicals, cycloalkyl radicals, and other hydrocarbon radicals, all of which are sometimes designated "R" herein, (2) oxyhydrocarbon radicals such as alkoxy radicals, aroxy radicals, etc., (3) organic salt-forming radicals such as the acetate radical, the oxalate radical, the acetyl-acetone radical, etc., (4) inorganic salt-forming radicals such as the halogen atoms (that is, fluorine, chlorine, bromine, and iodine atoms) as well as oxyhalide radicals, nitrate radicals, sulfate radicals, etc. and (5) hydrogen atoms, all such radicals 1 to 5 being sometimes hereinafter referred to as "X." The term "heavy metal occurring in the 4th to 10th positions of the long periods of the periodic table" includes the metals of groups IVB, VB, VIB, VIIB, and VIII including titanium, zirconium, hafnium, vanadium, niobium (columbium), tantalum, chromium, molybdenum, tungsten, manganese, technetium, rhenium, iron, cobalt, nickel, ruthenium, rhodium, palladium, osmium, iridium and platinum as well as metals in corresponding positions in the last long period in the so-called "actinium series" such as thorium and uranium.

The above definition of catalysts which are inactivated and removed by the method of this invention includes catalysts which are made up of a single organometallic compound having as its metallic portion a heavy metal atom of the group set forth, which heavy metal atom is connected by at least one of its valences to a carbon atom of an organic radical, and it also includes catalysts made by bringing together a plurality of chemical compounds, one of which may be an organometallic compound in which a carbon atom of an organic group is attached to a metal atom other than a heavy metal atom of the group set forth, for example, an alkali metal (such as sodium, potassium or lithium) or an alkaline earth metal (such as barium, calcium, or strontium) or magnesium, or aluminum, or zinc, or a rare earth metal, or tin, or lead, or some other metal, and another of which may be a simple compound such as a salt of a heavy metal of the group set forth, the two types of metal compounds each having the metal atoms connected only to radicals of the type set forth above. There is also included catalysts formed by reacting the heavy metal in activated form with an olefinic compound (which may be the same as that later polymerized) which provides the organic radical linked by carbon to the heavy metal atom.

Catalysts which are a single chemical compound include those compounds of the formula $R_a$—$M_H$—$(X)_b$ wherein $M_H$ is a heavy metal of the class set forth, R and X have the significance set forth and $a$ and $b$ are integers totaling the valence H of $M_H$. Catalysts which are made up of, or by reacting, a combination of chemical compounds, which are generally preferred because of the instability and difficulty of preparation of compounds of the $R_a$—$M_H$—$(X)_b$ type, include the following combinations:

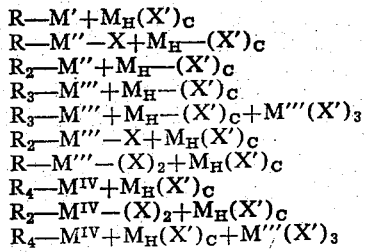

wherein M′ represents a monovalent metal such as sodium or lithium; M″ represents a bivalent metal such as barium or calcium; M‴ represents a trivalent metal such as aluminum; $M^{IV}$ represents a tetravalent metal such as tin; $M_H$, R and X represent the same as above, X′ represents a salt-forming (X) radical and C represents the maximum valence of $M_H$. Preferred catalysts of all the above types are those wherein:

R is an alkyl radical such as methyl, ethyl, propyl, butyl, isobutyl, amyl, hexyl, octyl, dodecyl etc., or a substituted alkyl such as phenylethyl, or an aryl radical such as phenyl, $M_H$ is titanium, zirconium, thorium, or uranium, most preferably titanium, X is hydrogen, halogen or oxyhalide, preferably halide, X′ is halogen, preferably chlorine, M′ is alkali metal, preferably sodium or potassium, M″ is an alkaline earth metal, or magnesium, or zinc, preferably magnesium, M‴ is aluminum or boron, gallium, indium or thallium, preferably aluminum, and $M^{IV}$ is tin or lead, preferably tin.

The preferred catalysts, both because of their greater activity and their ability to direct the course of polymerization toward 1,4-addition, are those prepared by reacting in an inert hydrocarbon solvent, and in the absence of oxygen, water, and other active -oxygen or -hydrogen containing materials, an aluminum alkyl of the type $R_a$—Al—$X_b$ wherein R is a hydrocarbon radical, as above defined, X is as defined above and $a+b=3$ with a titanium tetrahalide such as $TiCl_4$, with or without an aluminum halide of the types $AlX_3$, R—Al—$X_2$ or $R_2$—Al—X. Most preferred are the catalysts prepared from trialkyl aluminum compounds and titanium tetrachloride. When these compounds are brought together in solution a reaction occurs to produce the catalyst, in most cases the reaction being evidenced by the liberation of heat and sometimes by the formation of color and/or a precipitate. The reaction is best brought about by adding the metal components to an inert hydrocarbon solvent or diluent such as a saturated alkane, among which are butane, hexane, heptane, octane, cetane, or the like, or mixtures thereof, such as Deobase kerosine, diesel oil, or the mixture of alkanes resulting from the Fischer-Tropsch process or a cycloalkane such as cyclohexane or methyl cyclohexane or a benzene hydrocarbon such as benzene, toluene or xylene. It is important that the solvent be free of oxygen and water, and preferably that it also be free from peroxides, bivalent sulfur compounds, and various other impurities which can poison, decompose, or inactivate the various ingredients or interfere with the catalyst-forming reaction.

The reaction between the preferred alkyl aluminum compounds and a titanium tetrahalide, preferably titanium tetrachloride, may be carried out, for example, by adding triethyl aluminum, triisobutyl aluminum, or trioctyl aluminum to purified heptane or other solvent at room temperature followed by addition of the titanium tetrachloride (in absence of oxygen, water, etc.). Reaction usually occurs with the formation of a dark, sometimes black, and difficultly-soluble material. If the trialkyl aluminum heptane solution is first saturated with ethylene, isobutylene, etc. before the titanium tetrachloride is added, the formation of visible precipitate is usually avoided and a completely soluble catalyst is obtained. When an aluminum dialkyl halide, alkoxide, or other compound of the structure ($R_2$—Al—X) is employed, catalysts free of visible precipitate usually result. Those polymers prepared in contact with the latter catalysts usually are more easily recovered from the reaction mixture in a pure, more stable and less highly colored form.

The above-described heavy metal catalysts usually are employed to polymerize the hydrocarbon monomers by forming a solution or suspension of the catalyst in an inert (hydrocarbon) solvent (under an inert atmosphere) and then adding the monomeric material while the reaction mixture is cooled to maintain the temperature below about 100° C., and most preferably between 0 and 80° C. Free oxygen and oxygen-containing substance, water, active-hydrogen containing materials, surfur, acetylene and other catalyst poisons should be carefully excluded from the mixture during polymerization by using carefully purified and dried monomers and solvents and maintaining an inert atmosphere such as nitrogen over the reaction mixture. The pressure obtained during the reaction is not critical, pressures above or below atmospheric pressure or those due to the effects of the monomers and solvents alone being satisfactory. Monomers such as butadiene-1,3, isoprene, isobutylene, styrene, etc. are introduced in liquid form while maintaining an inert atmosphere or nitrogen over the reaction mixture. Under these conditions the monomeric hydrocarbon polymerizes, usually forming a viscous solution of polymer containing between about 8 and 12.5 percent total solids. In some solvents such as butane, for example, polyisoprene or polybutadiene are obtained as slurries of solvent-swollen polymer containing up to about 15 percent total solids. In hexane, heptane, benzene, naptha, and most other solvents, however, polyisoprene and polybutadiene are soluble. If a polymer solution is formed, an increase in solution viscosity is apparent shortly after the monomer is added. The reaction is rapid, and depending on catalyst concentration and molar ratio, and monomer and solvent purity, the reaction will be complete in as little as about 30 minutes to as much as 10 or 20 hours or more.

The relative proportions of hydrocarbon solvent, catalyst and monomeric hydrocarbon employed in the above-described polymerization process may be varied considerably. It is ordinarily desirable to employ an amount of solvent in excess of the monomeric hydrocarbon, usually between about 1 and about 30 times, on a volume basis, of that of the monomer, and preferably between about 5 and about 20 times the monomer charge. The concentration of catalyst likewise can be varied quite widely depending on the catalyst itself, on the monomer, and on the purity of all ingredients present. Usually, however, from about 0.5 to about 20 percent by weight, based on the weight of a monomer such as butadiene-1,3 or isoprene or 1.5 to 20 percent for other polyolefin monomers and mixtures of monomers, will be found sufficient. Where the preferred aluminum alkyl titanium catalysts are employed, the molar ratio of titanium:aluminum may be varied from as much as 3:1 to as little as 1:10 depending to some extent on the monomer. For directive polymerization of isoprene to form all cis-1,4-type polymer (synthetic natural rubber) the total concentration of catalyst will usually be 5 to 25 millimoles of each ingredient and a molar ratio at or near 1:1. For the preparation of an all trans-1,4 polybutadiene the catalyst concentration will usually be between 1.5 and 20 percent by weight with a molar ratio at or near 2:1.

The solvent, the molecular weight of the polymer, and to some extent the catalyst itself, will determine the proportion of polymer obtained in the final reaction mixture. For example, with heptane or benzene in the polymerization of isoprene, a polymer solution is obtained which becomes too viscous to agitate and adequately cool somewherein the region of 8 to 12.5 percent solids. With butane as a solvent slurries are obtained with isoprene or butadiene which become thick at slightly higher solids contents of 10 to 15 percent or slightly higher.

The invention will now be more fully described with reference to several specific examples which illustrate the preparation of the polymer-containing reaction mixture and the recovery operations employed to obtain a stable polymer in dry solid form.

*Example I*

In this example polyisoprene is prepared by the polymerization of purified, dewatered and deaerated isoprene in dewatered and deaerated benzene employing the reaction product of triisobutyl aluminum and titanium tetrachloried as a catalyst. To 500 ml. of dry, deaerated benzene in each of a number of large gingerale type glass bottles (which have been heated to dryness and then filled with dry nitrogen,) there are added about 40 grams or 59 ml. of isoprene and then 1.0 ml. of a triisobutyl aluminum containing 15 percent aluminum (8.8 millimoles of aluminum per liter of solvent) and amounts of titanium tetrachloride varying between 0.34 and 0.48 ml. (5.5 and 7.9 millimoles per liter) to produce a Ti/Al molar ratio ranging from 0.71:1 and 1:1.

The bottles are capped and then placed on a rack which rotates slowly in a bath maintained at about 5° C. In an hour or two the contents of some of the bottles have begun to increase in viscosity. After 16 to 17 hours the contents of all the bottles have become quite viscous and are very dark in color. The bottles are then removed from the bath and half of each of the benzene charges (250 ml.) is drained from the bottle through a needle and tubing into an empty 1 quart sample bottle maintained full of nitrogen by nitrogen sweeping. An additional 375 ml. of benzene are added to each of the sample bottles, the bottles capped and tumbled in a 20° C. water bath to dissolve the quite viscous cement in the additional solvent. When the cement has dissolved, the bottles are removed from the bath.

Portions of each bottle charge of diluted cement are drained through a 1/8 inch tube into a vessel containing a solution consisting of three parts by volume of benzene, one part by volume of methanol and about 5 grams of phenyl-beta-naphthylamine per liter of solution (solution at room temperature), meanwhile maintaining a nitrogen blanket over the solvent and vigorously agitating the liquid with a mechanical stirrer. As the cement is added to the benzene:methanol mixture, methanol is gradually added to the precipitating bath to maintain the 3:1 ratio. Upon addition to the precipitating bath the dark cement color is discharged. A fine crumb is almost instantly formed which aggregates to form a larger, loose crumb. Simple filtration in an open suction filter effectively removes the solvent-alcohol mixture containing catalyst residues. After the precipitation is complete, about one-half of the moist filter cake is reslurried in an equal volume of 3:1 benzene:methanol and then filtered again, the filtrate carrying away an additional portion of the catalyst residue.

The as-precipitated and once-reslurried portions of the polymer crumbs are each worked in pure methanol to fully harden them. Antioxidant solution (di-beta-naphthyl para-phenylenediamine plus 2,5-ditertiarybutyl hydroquinone in methanol-benzene) is kneaded into the wet polymer and the polymer wash milled with warm water to drive off more solvent and alcohol. The polymer is removed from the wash mill in sheets which are dried in a vacuum oven at 50° C. Sol-gel analysis of the two portions of dried polymer yields the following data:

| No. of Extractions | Percent Gel | Swelling Index | Intrinsic Viscosity (Toluene) | Percent Ash |
|---|---|---|---|---|
| 1 (As precipitated) | 10 | 122 | 3.58 | 0.09 |
| 2 (Reslurried) | 11 | 113 | 3.63 | 0.02 |

It is evident that the polymer from only one extraction (as precipitated) is fully equivalent in molecular weight to the twice extracted (reslurried) polymer. The reslurried polymer, however, is less highly colored and contained less ash as compared to the as-precipitated polymer. The dry polymers obtained above mill smoothly, readily accept compounding ingredients and vulcanize to form strong, "snappy" vulcanizates resembling those of natural rubber.

*Example II*

For purposes of comparison, one portion (about 250 ml.) of a benzene-polyisoprene cement prepared by a procedure similar to that of Example I is shortstopped by the addition thereto of about 150 ml. of a 2:1 benzene:methanol solution. After thorough mixing for one or two minutes the benzene:alcohol solution has dissolved in the cement forming a light yellow solution. No polymer precipitates. A portion of the latter diluted, alcohol-containing cement is then quickly poured into one liter of undiluted methanol to precipitate the polymer. Precipitation occurs with the formation of a single mass of polymer. The solvent-alcohol mixture is drawn off and an equal volume of undiluted methanol added to the polymer to wash it. It is necessary to squeeze and masticate the mass of polymer to facilitate extraction. The mass of polymer is then transferred to a wash mill, given three passes under warm water, antioxidant solution added and the polymer mixed for twelve additional passes, and then sheeted off and vacuum dried as before. Another 250 ml. portion of the original cement of this example is worked up at room temperature by the procedure of Example I. When the dried polymers are visually compared, the pure methanol coagulated polymer appears softer, shinier and less tough than the mixed solvent-alcohol precipitated polymer. Other benzene polyisoprene cements are worked up by the two above procedures. Sol-gel data on these two samples are as follows:

|  | Mixed Benzene:Methanol Precipitated | | Mass Coagulated in Undiluted CH₃OH | |
|---|---|---|---|---|
|  | Experiment 1 | Experiment 2 | Experiment 1 | Experiment 2 |
| Percent Gel | 10 | | 8 | |
| Swelling Index | 96 | | 84 | |
| Intrinsic Viscosity (I.V.) | 3.07 | 3.93 | 2.95 | 3.43 |
| Percent Ash | 0.06 | | 0.03 | |

From the above data it appears that the mixed solvent-alcohol precipitation most effectively prevents polymer degradation. It is surprising that the one or two minutes that elapsed between the addition of the 2/1 benzene/methanol solution to the cement and the precipitation in pure methanol would be sufficient to produce a reduction in I.V. of as much as 0.12–0.50. This would seem to indicate that the degradation induced by methanol-catalyst reaction products is very rapid. For this reason it is felt that catalyst inactivation (by alcohol) and polymer precipitation should be substantially simultaneous (without appreciable elapse of time between alcohol-contact and precipitation).

*Example III*

The procedure of Example I is repeated using heptane as the polymerization solvent to obtain a viscous all cis-1,4 polyisoprene-in-heptane cement containing about 10 percent solids. The cement is diluted with an equal volume of heptane and the diluted cement is then drained into a 3:2 heptane:ethanol solution (room temperature) contained in a nitrogen-swept vessel having an agitator. The cement is drained through a ⅛ inch diameter tube while rapid agitation is maintained. Simultaneously with the addition of the cement a small stream of ethanol is added to maintain the heptane:ethanol ratio essentially constant. A fine crumb is formed which then slowly aggregates to form a loose crumb from which the heptane-ethanol mixture may be removed by filtration carrying with it most of the catalyst residue. The filtered polymer crumbs are then reslurried once in a fresh quantity of 3:2 heptane-ethanol solution. The crumbs are then squeezed in pure ethanol to remove heptane and then dried. The product has a high intrinsic viscosity and a low ash content. In contrast, a portion of the same heptane cement is run into a solution of methanol saturated with heptane (1:2 heptane:methanol). No precipitation occurs but a distinct lower liquid layer separates which is found to be methanol (heptane-saturated) containing catalyst-alcohol reaction products. Methanol is but sparingly miscible in heptane and appears unable to precipitate polymer therefrom unless used in disproportionately large quantities.

*Example IV*

Isoprene is polymerized at 5° C. in pure butane and in benzene-butane mixtures containing 14.7% by volume of butane using triisobutyl aluminum:titanium tetrachloride catalyst, at a level of 8.8 millimoles titanium per liter of solvent (1:1 ratio). The product is a viscous slurry of swollen polymer in butane. The product in benzene:butane is obtained as solutions or cements. These polymers are worked up by two procedures: (1) for the butane slurries, the reaction mixtures are poured into butane:methanol mixtures (at −2° C.) ranging from 3:1 to 10:1 and (2) the benzene:butane cements are poured into 3:1 benzene:methanol at room temperature. The butane slurries, with the vigorous agitation induced by a propeller type agitator, are readily dispersed in the butane:methanol mixtures and a distinct crumb is formed. In 3:1 butane:methanol the crumb is fairly coarse, the individual crumb being almost too large for efficient extraction. In 8:1 to 10:1 butane:methanol the crumb is very fine, about as fine as can be handled by screening techniques.

The crumb formed by adding the benzene:butane cements to 3:1 benzene:methanol is quite fine at first but it aggregates quickly into a loose crumb which can be easily filtered on an open suction filter. In contrast, pouring the butane slurries and the benzene:butane solutions into undiluted methanol, and vice versa, causes the polymer to form into large masses which must be cut up for extraction. In all cases the crumbs of this example are easily finished off by the procedure of the preceding examples. The dried polymers are high in molecular weight, low in gel and ash content and vulcanize to form excellent vulcanizates.

*Example V*

Polyisoprene (essentially all cis-1,4) is prepared by polymerization at 5° C. employing a catalyst made by reacting triisobutyl aluminum and titanium tetrachloride. Viscous, dark-colored benzene cements are obtained in 20 to 30 hours of reaction which contain about 10 percent solids (40–98 percent conversion). One portion of each such charge is poured in a fine stream into a 3:1 benzene:methanol mixture (at room temperature) containing about 5 grams of phenyl-beta-naphthylamine per liter and maintained under a nitrogen blanket in a stainless steel vessel, the benzene:methanol solution being rapidly agitated to disperse the cement. About one-third the volume of the cement of methanol is gradually added along with the cement to maintain the 3:1 ratio. Fine crumbs of polymer form almost instantaneously. The liquid is then decanted off and discarded. The polymer crumbs are then redispersed in an equal volume of the same 3:1:0.5 solution and again filtered. At this point the wet polymer is divided into a number of equal portions. One such portion is reslurried a second time in the 3:1 benzene:methanol solution and once in undiluted methanol. A second portion is set aside for drying without further treatment.

Other portions of the original benzene polymer solution are treated in various ways as controls. One portion is treated with antioxidant and the cement is vacuum dried without alcohol treatment. Another portion is diluted with benzene and subjected to water extractions. Still another portion is introduced into a steam heated container of water to drive off the benzene. All the above polymers (except the vacuum dried cement) are stabilized with "BLE" and "Age-Rite White," wash milled to disperse the antioxidant and sheeted off for drying in a vacuum oven at 50° C. Sol-gel data and ash content are obtained on each sample. The data are as follows:

| Ti/Al Ratio | Ti in mM/l. | Percent Conversion | Percent Gel | S.I. | Sol-Gel Data | |
|---|---|---|---|---|---|---|
|  |  |  |  |  | I.V. | Percent Ash |
| 0.78/1 [1] | 7.2 | 90.2 | 11 | 75 | 3.37 | 0.02 |
| 0.78/1 [2] | 7.2 | 90.2 | 10 | 122 | 3.58 | 0.09 |
| 0.78/1 [3] | 7.2 | 90.2 | 11 | 113 | 3.63 | 0.02 |
| 0.78/1 [4] | 7.2 | 94.9 | 2 |  | 3.27 | 0.30 |
| 0.78/1 [5] | 7.2 | 94.9 | 11 | 57 | 3.44 | 1.40 |
| 0.78/1 [6] | 7.2 | 94.9 | 11 | 52 | 3.44 | 1.14 |

[1] 3:1 benzene:methanol extractions (2) + 1 CH₃OH wash.
[2] 3:1 benzene:methanol (as precipitated).
[3] Same as ([1]).
[4] Cement diluted with benzene and then water extracted.
[5] Antioxidant added to cement and vacuum dried, no washes.
[6] Hot water wash in steam heated water.

As will be seen in the above data, unextracted polymer (Sample No. 5) contains about 1.4 percent ash while polymer treated by the solvent:alcohol precipitation technique contains only 0.09 percent (No. 2). An additional extraction or two with solvent:alcohol or pure alcohol further reduces the ash content to 0.02 (Nos. 1 and 3). Water extraction is ineffective in reducing the ash content to a satisfactory value (Nos. 4 and 6) and, moreover, seems to produce some polymer degradation. It is apparent that for both elimination of polymer degradation and efficient extraction of catalyst residue it is better to (1) shortstop or inactivate the catalyst with alcohol rather than water or other substance capable of insolubilizing catalyst residues, (2) when using alcohol as the sole shortstop, effecting both catalyst inactivation and polymer precipitation substantially simultaneously to avoid degradation, (3) wash repeatedly the alcohol and/or solvent-alcohol mixtures, and (4) to convert the polymer precipitate to an easily handled crumb to facilitate further extraction and handling.

*Example VI*

Butadiene-1,3 is polymerized in toluene using a catalyst prepared from triisobutyl aluminum and titanium tetrachloride (2 ti/1 Al ratio) with a titanium concentration of 20 millimoles per liter of toluene. The polymerization is conducted at 50° C. with a reaction time of 16 to 17 hours to a conversion of about 50 percent. The product is a solution or cement of a polybutadiene wherein the percentage of trans-1,4 structure ranges up to 99 percent. Solutions are obtained containing from 3 to 10 percent total solids depending on conversion. The cement, in each case, is drained into a 3:1 toluene:methanol mixture containing about 5 grams per liter of a rubber antioxidant such as phenyl-beta-naphthylamine, the addition of the cement to the toluene:methanol solution being performed at room temperature under nitrogen and with vigorous agitation. Methanol is added along with the cement to maintain the 3:1 ratio. The polymer precipitates out of solution as a fine crumb which aggregates to form a loose, easily-handled crumb. The toluene:methanol solution is filtered out of the polymer and the latter is given two consecutive reslurrying treatments with 3:1 toluene:methanol solution followed by a single reslurrying in undiluted methanol. The latter treatment hardens the crumb and makes it easier to handle. In each case the precipitated and washed polymer is transferred to a wash mill, given several passes through the mill, antioxidant solution added and the latter worked into the polymer with additional passes through the mill. A warm water wash applied to the polymer on the mill drives off solvent leaving only a water-set sheet to be dried under vacuum at about 50° C. The resulting dry polymer sheets have a higher intrinsic viscosity, lower gel content and a lower ash content than a sample of the same polymer made by adding to the cement a 2:1 toluene:methanol solution followed by precipitation carried out by adding the alcohol-containing cement to raw methanol. As in the case of polyisoprene, the mixed solvent:alcohol precipitation produces a discrete crumb while addition of the cement to raw alcohol, or vice versa, produces a mass of agglomerated polymer which cannot be efficiently extracted or conveniently handled.

*Example VII*

In a similar fashion mixtures of isobutylene and isoprene containing about 10 percent isoprene by weight, mixtures of isoprene and propylene, isoprene and butene-1, isoprene and allyl chloride, butadiene-1,3 and allyl chloride, isoprene and chloroprene, and many others are prepared by solution polymerization in heptane or benzene using trialkyl aluminum titanium tetrachloride catalysts. In some cases the solutions contained only soluble polymer, in others mixtures of soluble polymer and insoluble polymer slurry. In all cases the soluble polymers could be precipitated at room temperature as a loose crumb in 3:2 heptane:ethanol or 3:1 benzene:methanol solutions. The polymer crumbs are easily worked up by the procedures of the preceding examples to form dried polymers of low ash contents.

*Example VIII*

In this example, a cement of an essentially all cis-1,4 polyisoprene in benzene (ca. 10 percent solids), similar to those of the preceding examples and containing the active residues of a triisobutyl aluminum:titanium tetrachloride catalyst is treated under a nitrogen atmosphere with triethanolamine to kill the catalyst and convert it to a soluble form in which it does not degrade the polymer. About 5 ml. of triethanolamine are added to about 500 ml. of cement and the cement agitated to disperse the additive. Upon addition of the triethanolamine the normally dark brown color and opaque character of the cement changes to a much lighter, yellowish color and the cement loses a great deal of its opacity. At this point the atmosphere is opened to the atmosphere for subsequent handling. The shortstopped cement is poured in a fine stream into 3:1 benzene:methanol (at R.T.) and with vigorous agitation, meanwhile adding about 100 ml. of pure methanol to hold the ratio near 3:1. The polymer separates out as an easily handled crumb which is separated by filtration and worked in methanol to further extract catalyst and benzene. The polymer is then dried under vacuum at about 50° C. As a control another 500 ml. portion of the same cement is shortstopped by addition of 25 ml. of pure methanol under nitrogen. The control shortstopped cement is then precipitated and worked up as before. The sol-gel data and ash analysis on the two samples are:

|  | Sol-Gel | | | |
| --- | --- | --- | --- | --- |
|  | Percent Gel | S.I. | (3) | Percent Ash |
| Triethanolamine shortstop | 9 | 75 | 4.16 | 0.23 |
| Pure methanol shortstop | 2 | 10 | 2.40 | <0.20 |

From the above ash data it is apparent that the benzene:methanol precipitation-extraction procedure can be utilized to remove both active and inactivated catalysts. The higher intrinsic viscosity (3) values of the triethanolamine shortstopped polymer, as compared to the values of the methanol shortstopped polymer, is further confirmation that the reaction mixture should make its first contact with ordinary alcohols in the precipitating bath.

*Example IX*

The procedure of Example VIII is repeated whereby the triethanolamine-treated reaction mixture is poured into mixtures of benzene and methanol contained in a precipitating vessel cooled with ice water. The precipitating medium is at 3-4° C. under these conditions. With a ratio of about 6:1 (benzene:methanol) no precipitation occurs; at a ratio of 5:1 an extremely fine dispersion of a highly solvated precipitate is obtained; at 4:1 a very fine precipitate forms which settles out leaving a cloudy supernatant layer; at 3:1 a fine, well-defined, easily handled crumb and clear supernatant are obtained; and at 2:1 a single large clump is obtained which has a tendency to break up under vigorous agitation. The use of lower precipitating temperatures appears to make the mixed benzene:methanol solution a poorer solvent for the polymer permitting a slightly lower proportion of alcohol than at room temperature.

*Example X*

In this example, one liter portions, a slurry of high molecular weight polyethylene (80–100 grams of polymer) and containing the active residues of a diisobutyl aluminum chloride:titanium tetrachloride catalyst is treated with 5 to 10 percent by volume of methanol to inactivate the catalyst. The resulting slurry is filtered and the filter cake from each portion added, with agitation, to one liter or either (1) a 1:1 benzene:methanol solution or (2) a 4:1 benzene:methanol solution. After several minutes agitation the slurry is filtered and the filter cake dried in a vacuum oven at about 50° C. When molded at about 400° F. the dried polymer samples produced clear, essentially colorless molded sheets. Ash analysis of the dried granular polymers show 0.01 to 0.04 percent or less ash. Similar polyethylene slurries added first to undiluted methanol and reslurried at least once more in undiluted methanol usually have ash contents several times that given above and sometimes discolor when molded. The extraction with benzene:methanol in ratio 1:1 to 4:1 may solvate the surface of the polyethylene particles thereby increasing the ease of catalyst extraction.

We claim:

1. The method of isolating a polymer from a reaction mixture prepared by polymerizing a conjugated polyolefin hydrocarbon monomer in an inert hydrocarbon diluent containing a catalyst made by reacting (1) an alkyl aluminum compound and (2) a titanium tetrahalide, which method comprises adding said reaction mixture to a mixed alcohol:diluent solution while agitating the latter to bring about (1) the separation of said polymer as discrete particles, (2) the extraction of the residues of said catalyst, and (3) the conversion of said particles of said polymer to an easily handled form, said mixed solution containing said alcohol and said diluent in proportions adapted to cause the controlled separation of the said polymer as discrete, easily-extracted particles of the desired size and physical condition, and separating said polymer particles from said mixed solution.

2. The method of isolating a polymer from a reaction mixture comprising a polymer solution prepared by polymerizing a monomeric material including a major proportion of a conjugated diene hydrocarbon in an inert hydrocarbon diluent containing a catalyst made by the reaction of (1) a trialkyl aluminum compound and (2) a titanium tetrahalide, which method comprises adding said reaction mixture to a mixed alcohol:diluent solution while agitating the latter to disperse the said reaction mixture therein, said mixed solution containing alcohol and said diluent in a volume ratio adapted to precipitate the said polymer from solution as discrete, easily-extracted particles of the desired size and to allow controlled aggregation of said particles to take place to form an easily handled crumb, and separating said crumbs from said mixed solution.

3. The method as defined in claim 2 wherein alcohol is added to said mixed solution, during the addition of said reaction mixture, to maintain the desired alcohol:diluent volume ratio.

4. The method of isolating a polymer from a reaction mixture comprising a solution of polymer in solvent prepared by polymerizing a butadiene-1,3 hydrocarbon containing no more than 5 carbon atoms in an inert hydrocarbon solvent containing a catalyst made by reacting (1) a trialkyl aluminum compound and (2) titanium tetrachloride, which method comprises adding said reaction mixture to a mixed alcohol:solvent solution while agitating the latter to disperse the said reaction mixture therein, the said solvent in said mixed solution being a solvent for said polymer and said mixed solution containing said alcohol and said solvent in a volume ratio adapted to precipitate said polymer as discrete, easily-extracted particles and controllably to aggregate said particles to crumb form and alcohol is added to said mixed solution during the addition of said reaction mixture to maintain said ratio, separating said crumb form of polymer from said mixed solution, and drying the said crumbs.

5. The method as defined in claim 4 wherein said reaction mixture is treated with a catalyst inactivator before being added to said mixed solution.

6. The method as defined in claim 4 wherein said crumbs are further extracted with a solvent for the residues of said catalyst before being dried.

7. A method as defined in claim 4 wherein a stream of said reaction mixture is added to a relatively large volume of said mixed solution and the latter is vigorously agitated to precipitate polymer as fine, discrete particles which aggregate slightly to form a larger, more easily handled crumb.

8. The method of isolating a stable polymer from a reaction mixture comprising a solution of polymer in benzene and prepared by polymerizing a butadiene-1,3 hydrocarbon containing no more than 5 carbon atoms in benzene containing a catalyst made by reacting (1) a trialkyl aluminum compound and (2) a titanium tetrahalide, which method comprises adding said reaction mixture to a benzene:alcohol mixture and agitating the latter to disperse the said reaction mixture therein, the said mixed solution containing benzene and alcohol in a volume ratio adapted to precipitate said polymer as discrete, easily-extracted particles and to aggregate said particles to crumb form and alcohol is added to said mixed solution during the addition of said reaction mixture to maintain said ratio, separating the said form of polymer from said mixed solution, and drying the separated crumbs.

9. A method as defined in claim 8 wherein the said reaction mixture is added, in the form of a stream, to a relatively large volume of said mixed solution and the latter is vigorously agitated.

10. A method as defined in claim 8 wherein the said crumb-like form of said polymer is extracted a second time with said benzene:alcohol mixed solution and an antioxidant is worked into the polymer before drying.

11. The method of isolating a stable, dry polymer from a reaction mixture comprising a solution of polyisoprene in benzene and prepared by polymerizing isoprene in benzene containing a catalyst made by reacting (1) a trialkyl aluminum compound and (2) titanium tetrachloride, which method comprises adding a stream of said reaction mixture to an agitated benzene:methanol mixed solution containing benzene and methanol in a volume ratio between about 1:1 to about 4:1, if at room temperature, and between about 2:1 to about 6:1 at 0 to 5° C., said stream of reaction mixture being relatively small compared to the volume of said mixed solution and the latter is agitated so as to disperse said reaction mixture in said mixed solution, thereby to precipitate said polyisoprene as discrete, easily-extracted crumbs, adding methanol to said mixed solution to maintain the said volume ratio within said limits, extracting said crumbs with a benzene:methanol solution and drying the extracted crumbs.

References Cited in the file of this patent

UNITED STATES PATENTS 2,458,378    Herbolsheimer  ----------- Jan. 4, 1949

FOREIGN PATENTS 533,362    Belgium  ---------------- May 16, 1955